US008665896B2

(12) United States Patent
Patel

(10) Patent No.: US 8,665,896 B2
(45) Date of Patent: Mar. 4, 2014

(54) ENABLING ADAPTIVE FREQUENCY AGILITY BY A BODY AREA NETWORK MEDIUM ACCESS CONTROL PROTOCOL

(75) Inventor: Maulin D. Patel, Tuckahoe, NY (US)

(73) Assignee: Koninklijke Philips N.V., Eindhoven (NL)

(*) Notice: Subject to any disclaimer, the term of this patent is extended or adjusted under 35 U.S.C. 154(b) by 207 days.

(21) Appl. No.: 13/058,011

(22) PCT Filed: Aug. 7, 2009

(86) PCT No.: PCT/IB2009/053496
§ 371 (c)(1),
(2), (4) Date: Apr. 6, 2011

(87) PCT Pub. No.: WO2010/018520
PCT Pub. Date: Feb. 18, 2010

(65) Prior Publication Data
US 2011/0176504 A1 Jul. 21, 2011

Related U.S. Application Data

(60) Provisional application No. 61/087,754, filed on Aug. 11, 2008.

(51) Int. Cl.
*H04L 12/28* (2006.01)
(52) U.S. Cl.
USPC .......................................... 370/431; 370/329
(58) Field of Classification Search
USPC .......... 370/319, 329, 341, 344, 349, 431, 464
See application file for complete search history.

(56) References Cited

U.S. PATENT DOCUMENTS 4,245,349 A * 1/1981 Kumaoka et al. .......... 455/165.1
2003/0174664 A1 9/2003 Benveniste
(Continued)

FOREIGN PATENT DOCUMENTS

EP 1657852 A1 5/2006

OTHER PUBLICATIONS

Gang Zhou et al: "SAS: Self-Adaptive Spectrum Management for Wireless Sensor Networks" Computer Communications and Networks, 2009. ICCCN 2009. Proceedings of 18th Internatonal Conference on, IEEE, Piscataway, NJ, USA, Aug. 3, 2009, pp. 1-6, XP031527728.

(Continued)

*Primary Examiner* — Brenda H Pham
(74) *Attorney, Agent, or Firm* — Larry Liberchuk

(57) ABSTRACT

Adaptive frequency agility in a body area network (BAN) is enabled by a medium access control protocol by adaptively snooping channels of a frequency band utilized in the BAN. The method includes selecting an anchor channel to be scanned from a rank order list of channels (S520); periodically scanning, at a predefined snoop time interval, the anchor channel for duration of a dwell time set for the anchor channel (S535); periodically scanning all channels preceding the anchor channel in the rank order list, wherein each preceding channel is being scanned for a different predefined duration; checking if a message is received on the anchor channel or any of the preceding channels (S570); selecting a channel ranked immediately after the anchor channel in the rank order list to be a new anchor channel when a message is not received (S540, S545) for a duration of a dwell time set for the anchor channel; and determining the channel on which a message is received to be the new anchor channel (S580).

11 Claims, 4 Drawing Sheets

(56) References Cited

U.S. PATENT DOCUMENTS

2005/0180385 A1   8/2005   Jeong et al.
2007/0263647 A1   11/2007  Shorty et al.
2010/0273419 A1*  10/2010  Rajagopal et al. ........... 455/41.2

OTHER PUBLICATIONS

El-Hoiydi et al., "WiseMAC: An Ultra Low Power MAC Protocol for the Downlink of Infrastructure Wireless Sensor Networks" Published in the Proceedings of the Ninth IEEE Symposium on Computers and Communication, ISCC'04, pp. 244-251, Alexandria, Egypt, Jun. 2004.

Joseph Polastre et al., "Versatile Low Power Media Access for Wireless Sensor Networks", ACM SenSys, Nov. 2004, pp. 95-107.

Buettner et al., "X-MAC: A Short Preamble MAC Protocol for Duty-Cycled Wireless Sensor Networks" ACM SenSys 2006.

* cited by examiner

ENABLING ADAPTIVE FREQUENCY AGILITY BY A BODY AREA NETWORK MEDIUM ACCESS CONTROL PROTOCOL

This application claims the benefit of U.S. Provisional Application No. 61/087,754 filed on Aug. 11, 2008.

The invention generally relates to medium access control (MAC) protocols utilized in body area networks (BANs) and, particularly, to techniques for supporting adaptive frequency agility by such protocols.

A body area network (BAN) is primarily designed for permanent monitoring and logging of vital signs. An exemplary BAN, as shown in FIG. 1, includes multiple slave devices 120 which are typically sensors that can be either wearable or implanted into the human body. The slave devices 120 monitor vital body parameters and movements, and communicate with each other over a wireless medium. The slave devices 120 can transmit data from a body to one or more master devices 130 from where the data can be forwarded, in real-time, to a hospital, clinic or elsewhere over a local area network (LAN), a wide area network (WAN), a cellular network, and the like.

One of the important factors in designing a BAN is the energy efficiency of slave devices 120 and/or master devices 130. Efficient energy consumption can be achieved by optimally duty cycling a receiver device (i.e., a device receiving data) between a listen state and a sleep state. The radio of a device is turned off when the device neither transmits nor receives data, thereby reducing the energy consumption of the device. A duty cycling is performed by a medium access control (MAC) protocol with the aim of minimizing idle listening and overhearing times, collisions of data transmissions, and controlling overhead, which ultimately leads to power savings.

MAC duty cycling techniques include synchronous and asynchronous modes. In an asynchronous mode a sender device (i.e., a device transmitting data on the medium) and a listener device (i.e., a device listening to the medium) have independent sleep and awake times, whereby an explicit synchronization mechanism, such as beacons, is not required.

A preamble sampling technique is widely used in asynchronous duty cycling MAC protocols, such as WiseMAC, B-MAC and X-MAC. The WiseMAC is further described in "*WiseMAC: An Ultra Low Power MAC Protocol for the Downlink of Infrastructure Wireless Sensor Networks,*" by El-Hoiydi, et al. published in the Proceedings of the Ninth IEEE Symposium on Computers and Communication, (ISCC) pages 244-251, Alexandria, Egypt, June 2004. The B-MAC is described in "*Versatile Low Power Media Access for Wireless Sensor Networks*", ACM SenSys, November 2004 by Polastre, et al., and the X-MAC protocol is published in "*X-MAC: A Short Preamble MAC Protocol for Duty-Cycled Wireless Sensor Networks*," ACM SenSys, 2006, by Buettner, et al.

As illustrated in FIG. 2, in the preamble sampling technique all the devices periodically listen to the medium for a short duration of time "$T_L$" and then return to a sleep state for the duration "$T_{CI}$", if the medium is idle. The time $T_{CI}$—between two successive listen times $T_L$—is a check interval. The combination of time intervals $T_{CI}$ and $T_L$ is a wake-up time interval. When a sender device has data to deliver, it transmits a wake-up (WUP) message 210 that is longer than the check time interval $T_{CI}$ of a receiver device. In the preamble sampling technique, a WUP message 210 carries only preambles and does not carry any other information. When a receiver device wakes-up, it senses the medium and detects the WUP message 210. This forces the receiver device to stay awake until the data is fully received and/or the medium becomes idle again.

The length of the WUP message 210 must be longer than the check interval $T_{CI}$ to ensure that a receiver device is awake when actual data is transmitted. If a check interval $T_{CI}$ of a receiver device is very long, then WUP message transmissions can occupy the medium for a prolonged time, thereby preventing other devices from accessing the medium.

There are several frequency bands being considered for BANs including, for example, the Medical Device Radiocommunication (MedRadio) service in 401-406 MHz in the USA. The MedRadio band is intended to be used for transmissions of non-voice data to support diagnostic and/or therapeutic applications involving implanted and body-worn medical devices. The Federal Communications Commission (FCC) has defined MedRadio rules to ensure efficient spectrum sharing and to mitigate harmful interferences to primary users of the band (e.g., Meteorological Aids, Meteorological Satellite, and Earth Exploration Satellite Services).

One of the provisions of MedRadio service also requires that an external programmer/control transmitter performs a Listen Before Talk (LBT) frequency monitoring procedure (i.e., monitoring a channel or channels it intends to occupy) prior to initiating a communication session to select a suitable least-interfering-channel for operation.

This requirement provides for using adaptive frequency agility (AFA). That is, the channel can be used for a communication session if no signal above a threshold power level is detected; otherwise, the controller should scan all the candidate channels and the channel with the lowest ambient power level can be accessed. Thus, using the MedRadio band that requires AFA precludes utilizing MAC protocols that are capable of only single channel operation. Examples of such MAC protocols include at least B-MAC, WiseMAC, X-MAC, and IEEE 802.15.4.

Therefore, it would be desirable to provide a BAN MAC protocol that supports AFA.

Certain embodiments of the invention include a method for adaptively snooping channels of a frequency band. The method comprises selecting an anchor channel to be scanned from a rank order list of channels; periodically scanning, at a predefined snoop time interval, the anchor channel for duration of a dwell time set for the anchor channel; periodically scanning all channels preceding the anchor channel in the rank order list, wherein each preceding channel is being scanned for a different predefined duration; checking if a message was received on the anchor channel or any of the preceding channels; selecting a channel ranked immediately after the anchor channel in the rank order list to be a new anchor channel, when a message was not received for duration of a sum of dwell times set for the channels being scanned; and determining the channel on which a message was received to be the new anchor channel.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
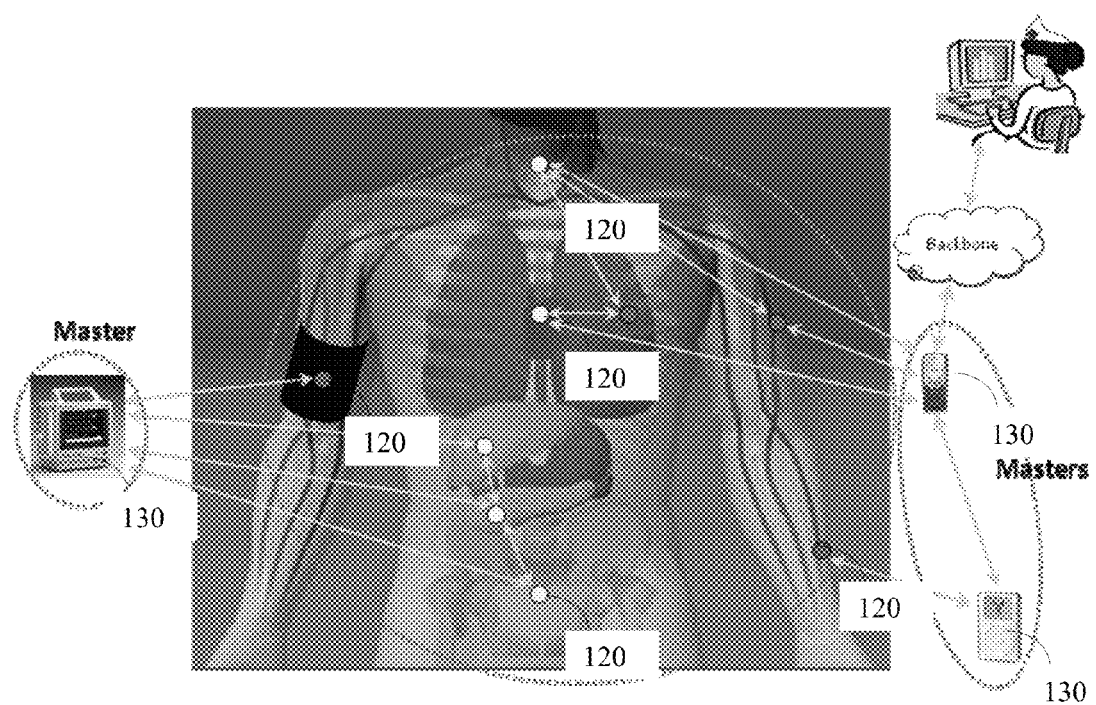
FIG. 1 is a schematic diagram of a body area wireless network.
Figure 2:
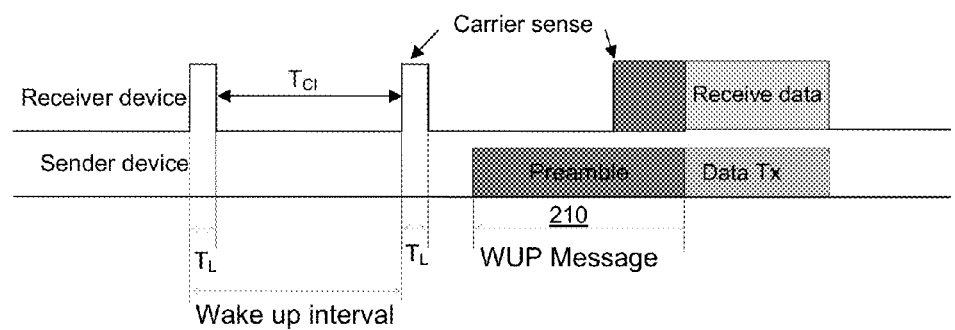
FIG. 2 is a diagram for illustrating the operation of an asynchronous duty cycling technique.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

In accordance with certain embodiments of the invention several MAC duty cycling techniques that support AFA are provided. The MedRadio rules state that a sender device should vacate a noisy channel and switch to a "quiet" channel at the beginning of a new session. Thus, coordination between the sender device and receiver device is required to enable communication while switching the channels. The disclosed techniques coordinate the access to the medium by the sender and the receiver devices under these provisions.

Generally, the radio component of a BAN device is capable of operating on a range of frequency bands divided into logical channels. According to certain embodiments of the invention, devices belonging to the same BAN maintain a rank order list of logical channels they intend to occupy. In one embodiment, the rank order list lists the logical channels in order of preference (e.g., primary, secondary, tertiary, etc.), and the list is shared across all the devices belonging to a single BAN. In one embodiment, a higher layer in the communication protocol stack (e.g., a network layer or an application layer) maintains and distributes the rank order list to devices in the network. At the device startup, a default rank order list is used until the network is formed, and then the channel ranking is updated in real time.

The primary channel is a channel which is deemed most suitable to carry out communication among peer devices (i.e., devices connected with each other in a peer-to-peer connection). If the primary channel becomes noisy, the sender device switches to the secondary channel, and if the secondary channel is not suitable for communication, then switching to the tertiary channel takes place.

Generally, a sender device prefers to transmit on the highest ranked idle channel. If the sender device finds that the highest ranked channel is noisy (hence, not available), the device assesses the state of the next highest ranked channel, and so on, until an idle channel is detected. It should be noted that if the sender device finds that the primary channel is busy, it may wait and listen again to check if the primary channel is now idle. In most cases, the sender device may find the primary channel idle after a short waiting period, and then it may access the primary channel. Only when the primary channel is busy for a prolonged period of time, the transmitter attempts to access the secondary channel. If both the primary and secondary channels are busy for prolonged predefined duration of time, the device attempts to access the tertiary channel, and so on.

A sender device dynamically switches the channels, whereby the receiver device may not know beforehand on which channel the incoming message will arrive. Furthermore, a receiver device cannot listen simultaneously to all logical channels. Each device (either slave 120 or master 130) in the BAN typically includes a single transceiver which can receive, transmit or listen to only one channel at a time. Additionally, each device duty cycles its transceiver between the active state and the sleep state to conserve energy, whereby the time that a receiver device can listen to a channel or channels is limited. Moreover, the state of the medium at the sender end and the receiver end may be different. For example, a sender device outside a human body may find a channel noisy, whereas at the same time a receiver device inside the body may find the same channel idle. This could be due to severe signal attenuation while passing through body tissues. Hence, it is not possible for a receiver to know for sure the state of the channel at the sender device end. As a sender device switches channels dynamically, the receiver device does not know beforehand on which channel the incoming message will arrive.

Figure 3:
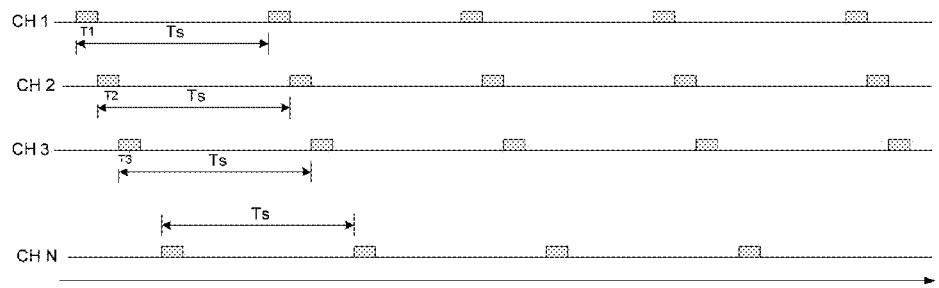
FIG. 3 is a diagram for illustrating the operation of a sequential snooping technique.

A straightforward approach to receive incoming message is to periodically scan N different channels, as per the sequential snooping technique illustrated in FIG. 3. A receiver device scans all the channels one by one in a round robin fashion. The purpose of the scanning is to detect the incoming messages, if any. As shown in FIG. 3, the receiver device scans at time $T_1$ channel ranked 1 ($CH_1$), at time $T_2$ channel ranked 2 ($CH_2$), and so on. Once all channels are scanned, the device may sleep for a while and then start again from channel ranked 1. The time between two successive initiations of scans of a channel is denoted as "Ts". The main drawback of this technique is that repeatedly scanning multiple channels consumes significant amount of power.

Figure 4:
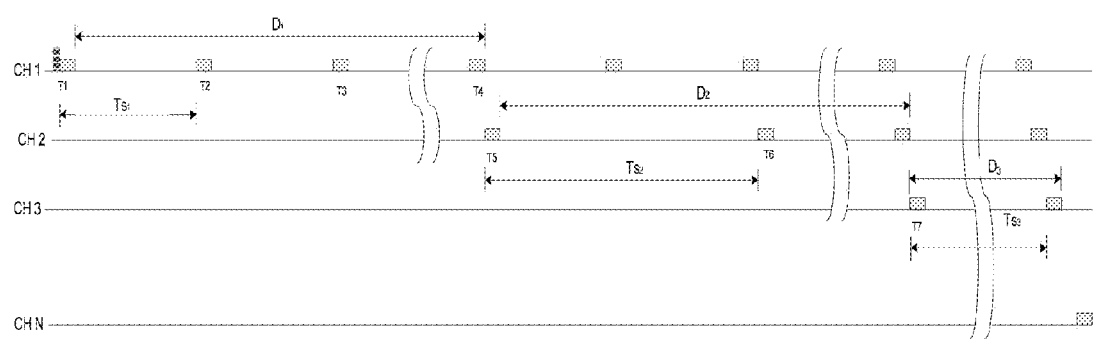
FIG. 4 is a diagram for illustrating the operation of an adaptive snooping technique realized in accordance with an embodiment of the invention.

FIG. 4 illustrates the adaptive snooping technique implemented in accordance with the principles of the invention. Typically, a sender device prefers higher ranked channels for communication over lower ranked channels. Therefore, the likelihood of a message arriving on a higher ranked channel is higher than on lower ranked channels. Therefore, a receiver device scans the higher ranked channels at a higher frequency (shorter interval) than lower ranked channels. As long as a receiver device keeps receiving messages on the higher rank channels, it does not scan lower ranked channels, thereby saving energy. Only when no messages are received on higher ranked channels for a predefined duration, the receiver device starts scanning lower ranked channels, albeit at a lower frequency (i.e., at a longer interval than higher ranked channels).

In the adaptive snooping technique, the channels are scanned according to their ranks in the rank order list. The set of channels being scanned is initialized with the primary channel. This set is gradually expanded to include lower ranked channels only if no messages were received on any of the higher ranked channels being scanned for predefined duration of time. As soon as a message is received, the set of channels being scanned is updated.

The adaptive snooping technique defines two different time periods per channel: a snoop interval $Ts_i$ and a dwell period $D_i$, where 'i' is the rank of the channel (i=1, 2, ..., N). Note that rank T is higher than rank 'i+1'. $Ts_i$ and $D_i$ are configurable parameters. Receiver devices periodically scan the $i^{th}$ ranked channel at an interval of $Ts_i$. If no messages are received on $i^{th}$ ranked channel for the duration of $D_i$ (where $D_i >= Ts_i$), a receiver device starts scanning channel ranked i+1 at the intervals of $Ts_{i+1}$ while it continues to scan the $i^{th}$ ranked channel at a time interval $Ts_i$. If messages are received neither on channels ranked i for the duration of nor on channel ranked i+1 for the duration of $D_{i+1}$ (where $D_{i+1} >= Ts_{i+1}$), the receiver device starts scanning channel ranked i+2 at the intervals of $Ts_{i+2}$. In one embodiment of the invention, $Ts_1 <= Ts_2 <= Ts_3 <= ... <= Ts_N$.

As shown in FIG. 4, at times $T_1$, $T_2$, $T_3$ and $T_4$, channel ranked 1 ($CH_1$) is snooped every time interval $Ts_1$ for duration of $D_1$. At the end of $D_1$, the receiver device starts scanning channel ranked 2 ($CH_2$) at time intervals $Ts_2$ for duration of $D_2$, while continuing to scan $CH_1$. Thereafter, at time $T_7$, the receiver device starts scanning channel ranked 3 ($CH_3$). It should be noted that the receiver device switches channels only if no activity is detected on the channel being scanned.

It should be appreciated that the adaptive snooping technique minimizes the number of channels being scanned, thereby significantly reducing the power consumption of a receiver device. A receiver device snoops only a primary channel, as long as the device periodically receives messages on that channel.

Figure 5:
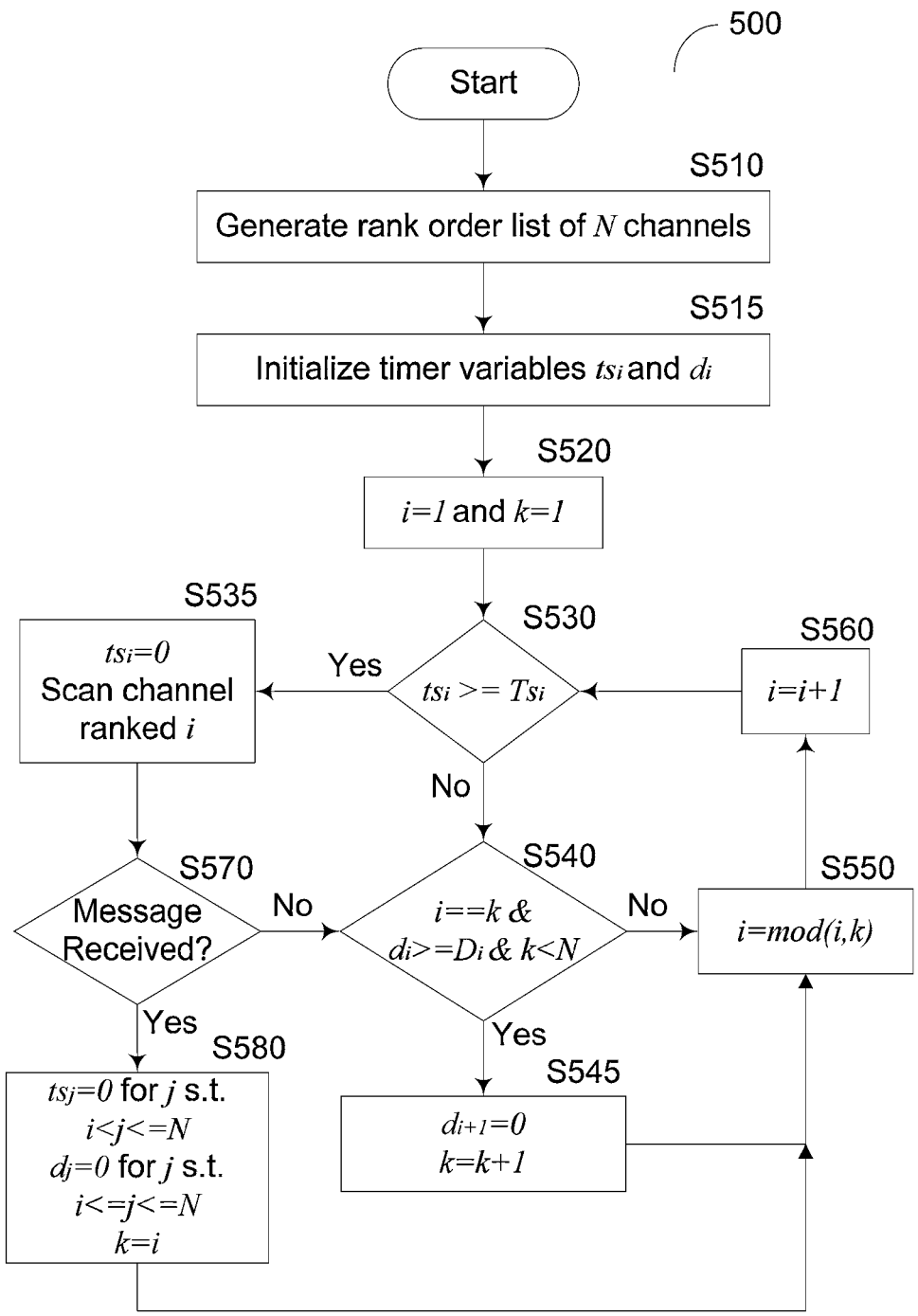
FIG. 5 is a flowchart for showing a method for adaptively snooping the medium in accordance with an embodiment of the invention.

FIG. 5 shows an exemplary and non-limiting flowchart 500 for describing the method for controlling the access to the medium in accordance with an embodiment of the invention. The method enables the adaptive snooping of the channels in order to support AFA provisions that are deemed by the frequency bands including, but not limited to, the MedRadio and industrial, scientific and medical (ISM).

At S510 a rank order list of channels is generated and distributed to all devices in the network. In one embodiment, the list is generated according to the noise level in each channel, where the channel with the lowest noise level is the primary channel (i.e., ranked first). Once created, the rank order list can be dynamically updated when the noise level in one or more channels changes. An updated list is effective only after it is successfully distributed throughout the network.

At S515 timer variables $ts_i$ and $d_i$ (i=1, . . . , N, where i denotes the channel rank index, and N is the number of channel in the rank order list) are initialized to zero. At S520, a channel rank index (i) and the number of channels to scan (k) are set to 1. That is, only the primary channel listed in the rank order list is selected to be the current channel to be scanned. At S530, it is checked if the value of the timer $ts_i$ is equal to or greater than the snoop time interval $Ts_i$ of the channel ranked i, and if so, execution continues with S535 where $ts_i$ is set to 0 and the channel ranked T is being scanned; otherwise, at S540 it is checked if the values of the indexes i and k are equal, if the value of the timer variable $d_i$ is equal or greater than the dwell time of the channel ranked i ($D_i$), and if the value of the index k is smaller than the total number of channels (N) in the list. If S540 results into a "Yes" answer, then at S545 the timer variable $d_{i+1}$ is set to 0, and the index k is incremented by 1. If S540 outputs a "No" answer, then at S550 the index i is set to the value of the remainder that results from division of index i by the index k. Thereafter, the index T is incremented by 1 (S560).

At S570 it is checked if a message is received on the channel ranked 'i', and if so at S580 the variables $ts_j$ (for such that i<=j<=N) are set to 0, the variables $d_j$ (for such that i<=j<=N) are set to 0, and the value of the index 'k' is set to the value of index T. That is, S580 selects the channel, on which a message is received, to be scanned first and further resets the respective timers. Thereafter, a process continues with S550. If S570 results into a "No" answer, then the process continues with S540.

The principles of the invention may be implemented as hardware, firmware, software or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

The invention claimed is:

1. A method for adaptively snooping channels of a frequency band, comprising:
   selecting an anchor channel to be scanned from a rank order list of channels;
   periodically scanning, by a wireless device, at a predefined snoop time interval, the anchor channel for duration of a dwell time set for the anchor channel;
   periodically scanning, by the wireless device, all channels preceding the anchor channel in the rank order list, wherein each preceding channel is being scanned for a different predefined duration;
   checking if a message is received on the anchor channel or any of the preceding channels;
   selecting a channel ranked immediately after the anchor channel in the rank order list to be a new anchor channel when a message is not received for a duration of a sum of dwell times set for the channels being scanned; and
   determining the channel on which a message is received to be the new anchor channel.

2. The method of claim 1, wherein selecting the channel ranked after the anchor channel in the rank order list to be the new anchor channel further comprises continuing with scanning of a new anchor channel and its preceding channels until a message is detected on one of the scanned channels or until all the channels in the rank order list have been selected.

3. The method of claim 1, wherein the selection of an anchor channel begins with the highest ranked channel in the rank order list.

4. The method of claim 1, further comprising generating the rank order list to include a list of channels ranked according to a noise level.

5. The method of claim 4, wherein a channel with the lowest noise level is ranked first in the rank order list.

6. The method of claim 4, wherein the rank order list is dynamically updated when a noise level of at least one channel is changed.

7. The method of claim 4, wherein each channel is set with a dwell time and a snoop time interval.

8. The method of claim 7, wherein a snoop time interval of a channel defines a frequency for scanning the channel.

9. The method of claim 7, wherein a snoop time interval of a first ranked channel is no greater than a time snoop time interval of a second ranked channel, and the snoop time interval of the second ranked channel is no greater than a snoop time interval of a third ranked channel.

10. The method of claim 1, wherein the frequency band is a Medical Device Radiocommunication (MedRadio) service band utilized in a body area network (BAN).

11. A non-transitory computer readable medium having stored thereon computer executable code causing a processor or a computer to perform a process of adaptively snooping channels of a frequency band, comprising:
- selecting an anchor channel to be scanned from a rank order list of channels;
- periodically scanning, at a predefined snoop time interval, the anchor channel for duration of a dwell time set for the anchor channel;
- periodically scanning all channels preceding the anchor channel in the rank order list, wherein each preceding channel is being scanned for a different predefined duration;
- checking if a message is received on the anchor channel or any of the preceding channels;
- selecting a channel ranked immediately after the anchor channel in the rank order list to be a new anchor channel when a message is not received for a duration of a sum of dwell times set for the channels being scanned; and
- determining the channel on which a message is received to be the new anchor channel.

* * * * *